United States Patent
Park et al.

(10) Patent No.: US 11,937,575 B2
(45) Date of Patent: Mar. 26, 2024

(54) BAND-TYPE WEARABLE DEVICE FOR PET

(71) Applicant: PETPULS LAB INC., Anyang-si (KR)

(72) Inventors: Jungki Park, Hwaseong-si (KR); Jaeseok Jo, Seoul (KR)

(73) Assignee: PETPULS LAB INC., Anyang-si (KR)

(*) Notice: Subject to any disclaimer, the term of this patent is extended or adjusted under 35 U.S.C. 154(b) by 377 days.

(21) Appl. No.: 17/437,699

(22) PCT Filed: Apr. 30, 2019

(86) PCT No.: PCT/KR2019/005199
§ 371 (c)(1),
(2) Date: Sep. 9, 2021

(87) PCT Pub. No.: WO2020/189839
PCT Pub. Date: Sep. 24, 2020

(65) Prior Publication Data
US 2022/0125019 A1    Apr. 28, 2022

(30) Foreign Application Priority Data
Mar. 15, 2019    (KR) ........................ 10-2019-0030049

(51) Int. Cl.
*A01K 27/00*    (2006.01)
*A44C 5/18*    (2006.01)

(52) U.S. Cl.
CPC .......... *A01K 27/001* (2013.01); *A01K 27/005* (2013.01); *A44C 5/18* (2013.01)

(58) Field of Classification Search
CPC .......................... A01K 27/001; A01K 27/005; A44B 11/2596; A44B 17/0023; A44B 11/2511;
(Continued)

(56) References Cited

U.S. PATENT DOCUMENTS 8,919,019 B2 * 12/2014 Martinez ................ G06F 15/00
224/171
2003/0116596 A1 * 6/2003 Terasawa ............. A44C 5/0007
224/179
(Continued)

FOREIGN PATENT DOCUMENTS

| KR | 10-2004-0020579 A | 3/2004 |
| KR | 10-2013-0089425 A | 8/2013 |
| KR | 10-2017-0052176 A | 5/2017 |

OTHER PUBLICATIONS

International Search Report for PCT/KR2019/005199 dated Dec. 12, 2019 from Korean Intellectual Property Office.

*Primary Examiner* — Monica L Perry
*Assistant Examiner* — Brook Victoria Schmid
(74) *Attorney, Agent, or Firm* — Paratus Law Group, PLLC (57) ABSTRACT

Disclosed is a band-type wearable device for a pet which includes: a case having a coupling groove formed so as to open to an outside, and a locking groove concavely formed at an upper side of the coupling groove; a strap of which a distal end is connected to the case, and which is made of a flexible material wrapped around a pet's body and worn on the pet; a fixing bracket which is mounted at the distal end of the strap and includes a sliding coupling portion formed to protrude outward from the distal end of the strap so as to be inserted by sliding into the coupling groove and connect the distal end of the strap to the case; and a locking member coupled to the inner side of the distal end of the strap.

5 Claims, 10 Drawing Sheets

(58) Field of Classification Search
CPC ... A44B 11/2507; A44B 11/2503; A44C 5/14; A44C 5/142; A44C 5/147
USPC .......................................... 224/164; 24/664
See application file for complete search history.

(56) References Cited

U.S. PATENT DOCUMENTS

| | | | | |
|---|---|---|---|---|
| 2005/0145203 | A1* | 7/2005 | Wang | A01K 27/005 |
| | | | | 119/865 |
| 2014/0196672 | A1* | 7/2014 | Bogdahn | A01K 27/003 |
| | | | | 24/591.1 |
| 2016/0040698 | A1* | 2/2016 | Perkins | A44B 17/0011 |
| | | | | 24/664 |
| 2016/0135431 | A1 | 5/2016 | Sheldon et al. | |
| 2018/0011448 | A1* | 1/2018 | Von Allmen | G04B 37/1493 |
| 2018/0125038 | A1 | 5/2018 | Hord et al. | |
| 2018/0289115 | A1* | 10/2018 | McCray | A44C 5/22 |
| 2019/0304345 | A1* | 10/2019 | Stapleton | A01K 27/001 |

* cited by examiner

BAND-TYPE WEARABLE DEVICE FOR PET

CROSS-REFERENCE TO PRIOR APPLICATIONS

This application is a National Stage patent application of PCT International Patent Application No. PCT/KR2019/005199 (filed on Apr. 30, 2019) under 35 U.S.C. § 371, which claims priority to Korean Patent Application No. 10-2019-0030049 (filed on Mar. 15, 2019), which are all hereby incorporated by reference in their entirety.

BACKGROUND

The present disclosure relates to a device to be worn on a pet, and more particularly, to a wearable device for a pet, the device in which a case embedded with various electronic components to obtain state information of the pet such as a dog is easily fastened to and separated from a strap that is to be worn on a body part such as neck of the pet.

In recent years, more and more people have been living with various types of pets in order to avoid the monotony of daily life which is led by the widespread of nuclear family and western civilization. These pets are of diverse species including dogs, cats, and even pigs depending on owners' taste.

Such pets are not simply animals raised for pleasure or profit, but are respected as living things and accepted as family members who lives and interacts with people. Accordingly, a device in which electronic components, including a sensor to obtain various types of information such as emotional state, location information, biometric information, etc. of a pet, a communication module, a microprocessor, a light emitting device, and the like, is allowed to be worn on a body part such as the neck and chest of the pet has been recently developed.

In order to have a pet wear the electronic components for obtaining state information of the pet, a case having the electronic components embedded therein is formed integrally with a strap or the case is connected to a distal end of a strap made of a flexible material.

However, when the case and the strap are integrated, it is not possible to replace the strap, so there is a limit to the function as an accessory for a pet.

In order to solve this problem, there have been attempts to make straps of various colors and allow a user to replace a used strap with another strap of a different color to fit the user's mood or situation. However, it is not easy to separate or connect the case and the strap and the configuration is complex, which increases a manufacturing cost and contributes to a disadvantage in commercial value.

For example, conventionally, a method for connecting a case and a strap with a fastening part such as a screw and a pin, or a one-touch fastening method using a hook-type fastening part connected to a button has been used. However, in the method for connecting the case and the strap with the fastening part such as a screw and a pin, it is inconvenient when it comes to separation and connection and maintenance of the fastening part is difficult.

In addition, in the existing one-touch fastening method, it is difficult to connect the button and the fastening part, and the button exposed to the outside affects the aesthetics. Also, a structure for fastening may come into contact with a pet's body, making the pet uncomfortable and, in a sever case, causing a risk of injury due to scratching or getting caught in hair.

SUMMARY

The present disclosure provides a band-type wearable device for a pet, the device which allows easy attachment or detachment of an electronic component-embedded case to/from a strap by one touch, wherein a configuration for detachment and attachment is not exposed to the outside but hidden, which improves aesthetics and contributes a simple configuration, thereby reducing a manufacturing process and a manufacturing cost.

In an aspect, a band-type wearing device for a pet includes: a case having a coupling groove formed so as to open to an outside, and a locking groove concavely formed in an upper side of the coupling groove; a strap of which a distal end is connected to the case, and which is made of a flexible material wrapped around the pet's body and worn on the pet; a fixing bracket which is mounted at the distal end of the strap and comprises a sliding coupling portion formed to protrude outward from the distal end of the strap so as to be inserted by sliding into the coupling groove and connect the distal end of the strap to the case; and a locking member having an inner end, an outer end and a locking protrusion, the inner end being coupled to an inner side of the distal end of the strap such that displacement occurs downward by a force pressing an upper side of the distal end of the strap, the outer end protruding outward from the distal end of the strap together with the sliding coupling portion so as to be inserted while sliding into the coupling groove together with the sliding coupling portion, and the locking projection protruding from the locking member and being caught in the locking groove at an upper side of the outer end.

The fixing bracket may include: a fixing portion embedded in the distal end of the strap and fixed thereto; an mounting cutout portion having a form of a groove concave downward in the middle of the fixing portion and having the locking member mounted therein; and a sliding coupling portion formed to protrude outward from the distal end of the strap so as to be inserted into the coupling groove and coupled thereto.

The locking member may have an approximately ¬-shape, a vertical portion of the locking member may be fixedly coupled to one end of the mounting cutout portion, an outer end of a horizontal portion of the locking member fits the sliding coupling portion and is inserted into the coupling groove together with the sliding coupling portion, and the displacement may occur as the horizontal portion is elastically bent downward by an external force transmitted through the upper side of the distal end of the strap.

The fixing bracket may be made of a hard material and is insert-injection molded into and fixed to the strap.

The coupling groove may be formed at both ends of the case, the strap may be provided as two straps connected to respective coupling grooves at the both ends of the case via the fixing bracket, and the respective straps may be detachably connected to each other by a strap connecting member that is adjustable in length.

According to the present disclosure, it is possible to simply fasten the strap by one touch by pushing the sliding coupling portion of the fixing bracket mounted at the distal end of the strap into the coupling groove of the case, and to maintain a stable wearing state even after the strap is fastened.

In addition, when the upper side of the distal end of the strap where the locking member is mounted is pressed to separate the strap from the case, pressure is transmitted to the locking member through the strap made of a flexible material and the locking member is bent to release the fastened state, and therefore, the strap may be easily separated by one touch.

Therefore, it may be possible to easily fasten and separate the strap and the case and to easily replace with a strap of various colors or design to fit a user's mood or situation, thereby greatly improving the user's satisfaction.

In addition, since a configuration for fastening between the strap and the case may be simplified, it is possible to reduce a manufacturing cost.

In addition, since the fixing bracket for fastening is completely embedded in the case and fastened thereto, the fastening part is not exposed to the outside, and there is no need to provide a structure such as a separate button for fastening and releasing. Therefore, it is possible not only to provide an excellent aesthetic appearance, but also to prevent a discomfort and risk of injury that could be caused by a portion protruding outward when the device is worn.

DETAILED DESCRIPTION

Embodiments described in the present disclosure and configurations shown in the drawings are merely examples of the embodiments of the present disclosure, and may be modified in various different ways at the time of filing of the present application to replace the embodiments and drawings of the present disclosure.

Hereinafter, a band-type wearing device for a pet will be described in detail according to the embodiments described below with reference to the accompanying drawings. In the drawings, like reference numerals denote like elements.

Referring to FIGS. 1 to 7, a band-type wearing device for a pet according to an embodiment of the present disclosure includes: a case 10; two straps 20 each of which is connected to a distal end of the case 10, and which is made of a flexible material wrapped around a pet's body and worn on the pet; a fixing bracket 30 which is mounted at a distal end of each strap 20 to connect the distal end of a corresponding strap 20 to the case 10; and a locking member 40 which is mounted on one side of the fixing bracket 30 to prevent the fixing bracket 30 from coming off, and in which displacement occurs downward by a force pressing an upper side of the distal end of the corresponding strap 20.

The case 10 is in the form of a housing in which electronic components or various small items or accessories necessary for pets can be embedded. The electronic components installed in the case 10 include a sensor for detecting an emotional state, health state, biometric information, etc. of a pet, a global positioning system (GPS) for detecting position information, a microprocessor, a printed circuit board (PCB), a light emitting device such as an LED, a wireless communication module, a battery, and the like. In addition, various other electronic components may be applied.

In both ends of the case 10, a coupling groove 11 for detachable coupling with the fixing bracket 30 is formed. The coupling groove 11 has a C-shaped cross-section so that a side facing an outside (a side facing the strap) is opened, and one distal end in a longitudinal direction of the coupling groove 11 is opened to the outside through one side of the case 10. In an upper side of the middle of the coupling groove 11, a locking groove 12 concave upward is formed.

The strap 20 is made of a flexible and highly elastic resin material such as silicone, and has a long band shape to be wound around the neck of a pet (e.g., a dog) and worn thereon. The strap 20 is provided as two divided straps connected to both ends of the case 10 by the fixing bracket 30, and the straps 20 are detachably connected to each other by a strap connecting member that is adjustable in length.

In this embodiment, the strap connecting member includes a strap through hole 21 formed at a distal end of one strap 20; fixing holes 22 arranged at predetermined intervals along a longitudinal direction of one strap 20; and at least one fastening protrusion 23 formed to protrude from a distal end of the other strap 20 and elastically inserted into a fixing hole 22 and coupled thereto. Therefore, after the two straps 20 are wrapped around the body (e.g., neck) of a pet, a distal end of a strap 20 having the fastening protrusion 23 formed therein is passed through a strap through hole 21 of the other strap 20. Then, when the fastening protrusion 23 is press-fitted into a fixing hole 22 at an appropriate position to fit a body size of the pet and coupled to the fixing hole 22, the strap 20 and the case 10 may be easily worn on the pet.

Figure 8A:
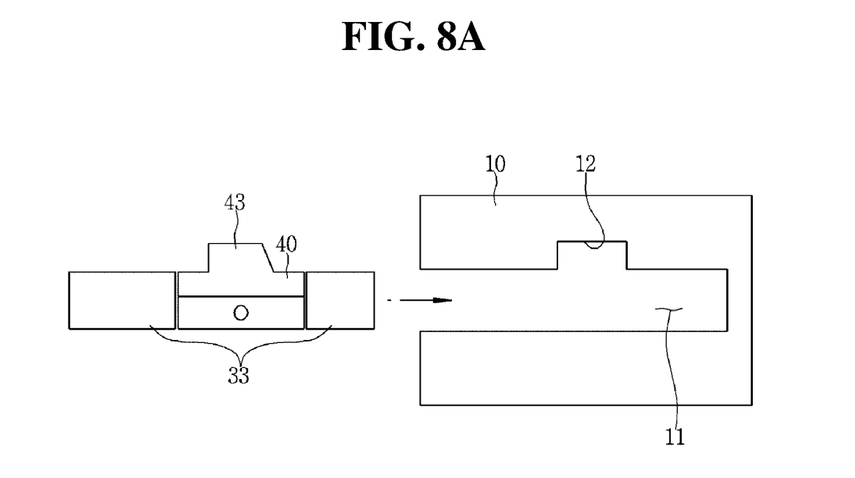
FIGS. 8A and 8B are front cross-sectional views illustrating an operation example for fastening between the case and the strap of the band-type wearing device for a pet shown in FIG. 1, respectively.
Figure 8B:
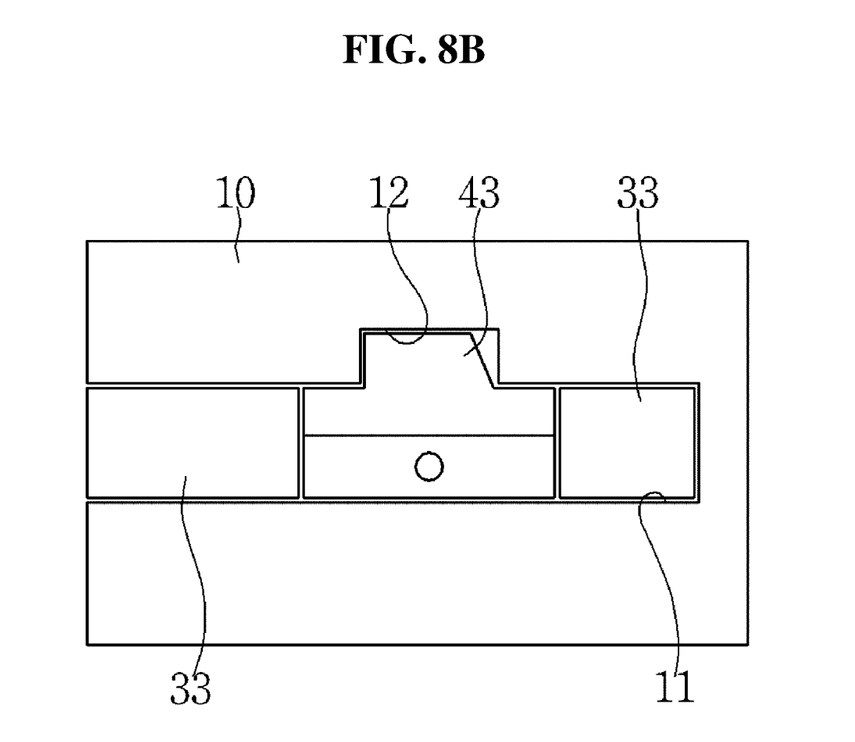

As described above, the fixing bracket 30 for detachment from and attachment to the case 10 is embedded in and mounted at the distal end of each of the two straps 20. In the fixing bracket 30, a sliding coupling portion 33 having a cross-sectional shape corresponding to the coupling groove 11 is formed to protrude outward from the distal end of each of the straps 20. Therefore, as shown in FIGS. 8A and 8B, when a distal end of one sliding coupling portion 33 is aligned with the distal end of the coupling groove 11 and then pushed laterally, the sliding coupling portion 33 may slide into the coupling groove 11 and smoothly couple thereto.

The fixing bracket 30 is made of a hard material, unlike the straps 20, and is fixedly mounted at a distal end of a strap 20. The fixing bracket 30 may be formed integrally with the strap 20 by insert injection molding. The fixing bracket 30 includes a fixing portion 31 embedded in the distal end of the strap 20 and fixed thereto, an mounting cutout portion 32 which has the form of a groove concave downward in the middle of the fixing portion 31 and in which the locking member 40 is mounted, and a sliding coupling portion 33 integrally formed at a distal end of the fixing portion 31.

The sliding coupling portion 33 of the fixing bracket 30 is formed to protrude outward from the distal end of the strap 20, and has a shape corresponding to the coupling groove 11 so as to be inserted by sliding into the coupling groove 11. In this embodiment, the sliding coupling portion 33 is configured with two parts spaced apart from each other by a predetermined distance along the longitudinal direction at the distal end of the mounting cutout portion 32.

A screw fastening hole 35 for fixing a distal end of the locking member 40 is formed at an inner end of the mounting cutout portion 32.

The locking member 40 has an approximately 'L' shape, and a vertical portion 41 at the inner end of the locking member 40 is fixedly coupled to one end of the mounting cutout portion 32 by a fastening member such as a screw 45, and an outer end of a horizontal portion 42 of the locking member 40 coincides with the sliding coupling portion 33 and is inserted into the coupling groove 11 together with the sliding coupling portion 33. The horizontal portion 42 of the locking member 40, except for the outer end thereof, is disposed inside the distal end of the strap 20 such that the horizontal portion 42 is elastically bent downward by a force pressing the upper side of the distal end of the strap 20 and is then restored to its original state by its own elasticity and becomes flat when the pressing force is lost or weakened.

An upper surface of the distal end of the horizontal portion 42 of the locking member 40 has a curved surface corresponding to the shape of the sliding coupling portion 33, and a locking projection 43 to be caught in the locking groove 12 of the coupling groove 11 is formed in the curved surface to protrude upward. One side of the locking projection 43 may be sloped so that the locking projection 43 smoothly moves without being caught in the upper surface of the coupling groove 11 when the locking member 40 is inserted into the coupling groove 11.

Hereinafter, an operation of the band-type wearing device for a pet configured as described above will be described.

First, when the strap 20 is connected to the case 10, one end of the sliding coupling portion 33 of the fixing bracket 30 is aligned with one end of the coupling groove 11, which is opened through one side of the case 10 (see FIG. 8a).

Then, when the sliding coupling portion 33 of the fixing bracket 30 is pushed into the coupling groove 11, the sliding coupling portion 33 and the locking member 40 both slide laterally along the coupling groove 11. In this case, the locking protrusion 43 at an upper end of the locking member 40 moves while being pressed by the upper surface of the coupling groove 11 and is elastically inserted into the locking groove 12 at a position of the locking groove 12, thereby completing fastening between the fixing bracket 30 and the case 10 (see FIG. 8b).

In this case, even if a tensile force is applied to the strap 20 in the longitudinal direction, the sliding coupling portion 33 of the fixing bracket 30 is caught in the coupling groove 11 and does not come out of the coupling groove 11, and thus, the fixing bracket 30 and the case 10 may remain coupled. In addition, when a force is applied in a lateral direction orthogonal to the longitudinal direction of the strap 20, the locking member 40 and the sliding coupling portion 33 may remain coupled to the case 10 without moving laterally due to the coupling between the locking projection 43 and the locking member and the locking groove 12 of the case 10.

Figure 9A:
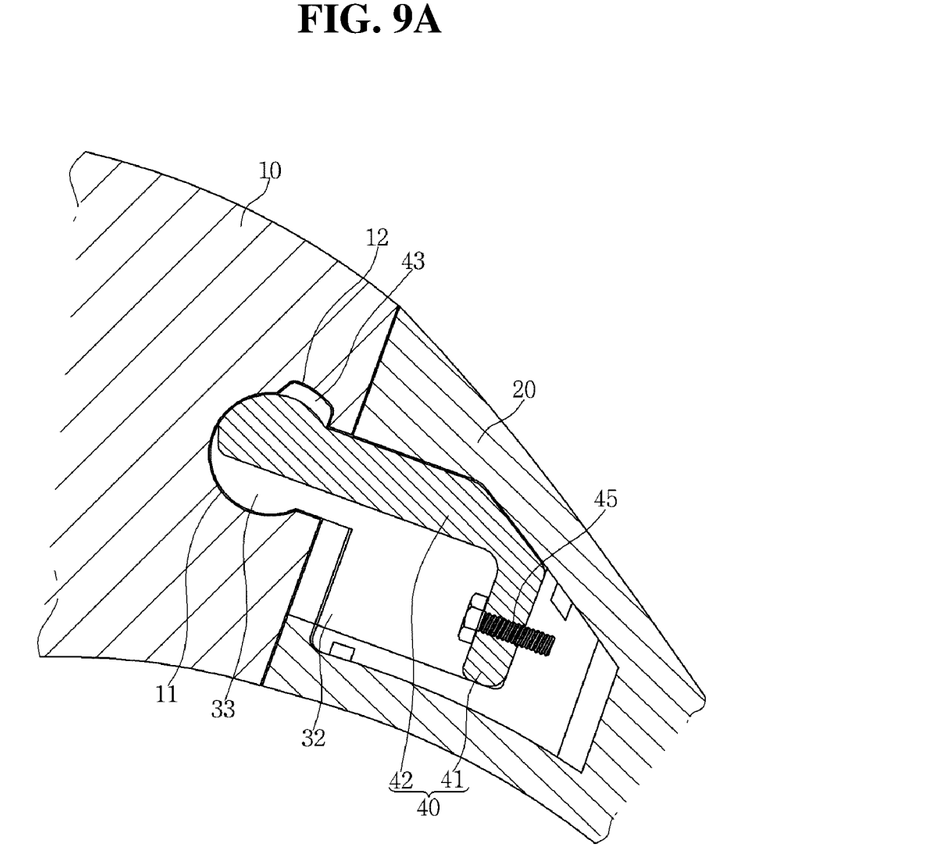
FIGS. 9A and 9B are side cross-sectional views illustrating an operation example for separation between the case and the strap of the band-type wearing device for a pet shown in FIG. 1, respectively.
Figure 9B:
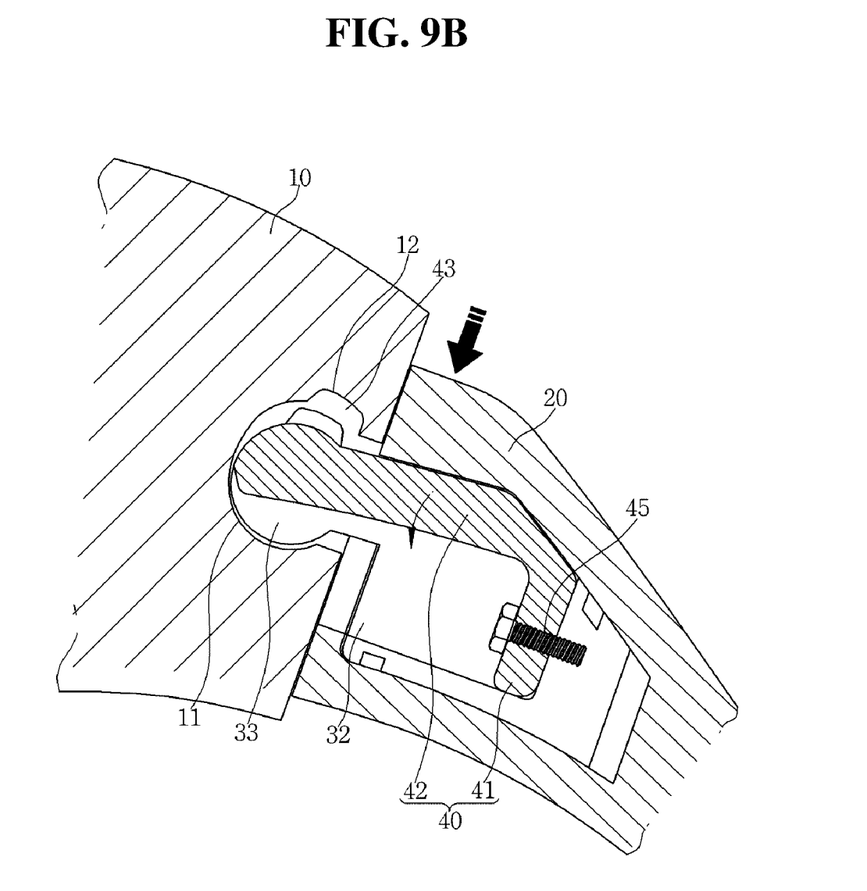

In a case where a user wants to separate the strap 20 from the case 10 in order to replace with another strap 20 of a new color or design and uses a finger to presses the upper surface of the distal end of the strap 20 in which the locking member 40 is mounted, as shown in FIG. 9B, pressure is transmitted to the horizontal portion 42 of the locking member 40 as a portion pressed by the finger is elastically deformed because the strap 20 is made of a flexible and elastic resin material. Accordingly, the horizontal portion 42 is bent downward and the locking projection 43 moves downward and comes out of the locking groove 12.

If the fixing bracket 30 is pushed laterally in this state, the sliding coupling portion 33 and the locking member 40 slide in the opposite direction to the previous direction and come out of the coupling groove 11, and the coupling may be therefore completely released.

As described above, in the band-type wearing device for a pet of the present disclosure, the strap 20 may be easily fastened by one touch by pushing the sliding coupling portion 33 of the fixing bracket 30 to the coupling groove 11 of the case 10. In a case where the strap 20 is to be separated, it is possible to easily separate the strap 20 by moving the strap 20 laterally while pressing the upper side of the distal end of the strap 20 in which the locking member 40 is mounted.

Therefore, since the strap 20 may be easily fastened to and separated from the case 10, a user is able to easily replace the strap 20 to fit the user's mood or situation.

Figure 1:
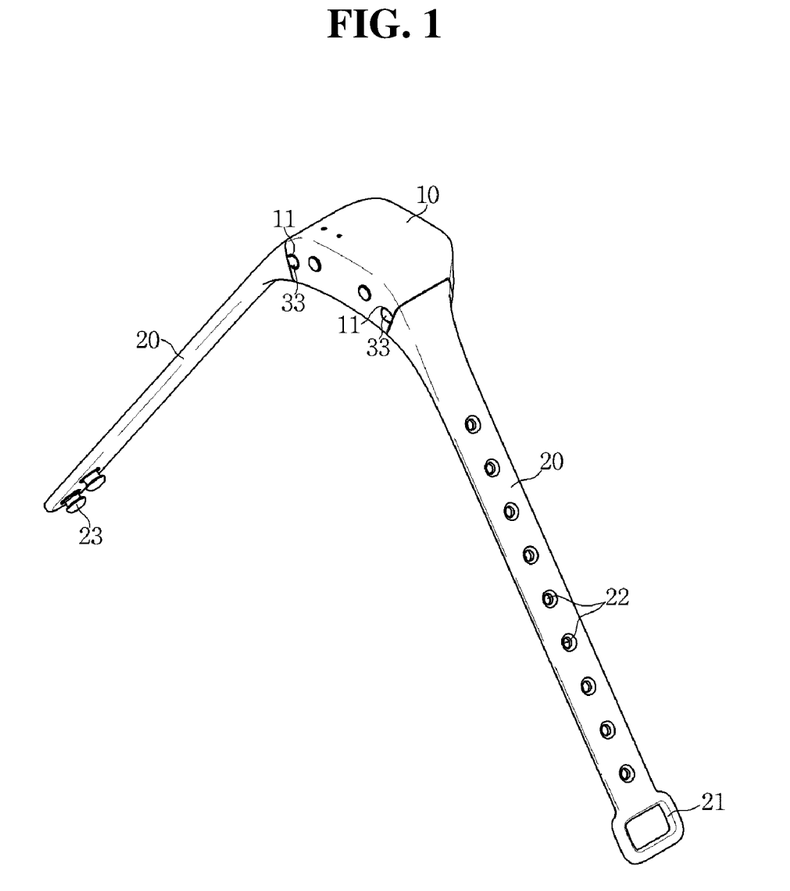
FIG. 1 is a perspective view illustrating a band-type wearing device for a pet according to an embodiment of the present disclosure.
Figure 2:
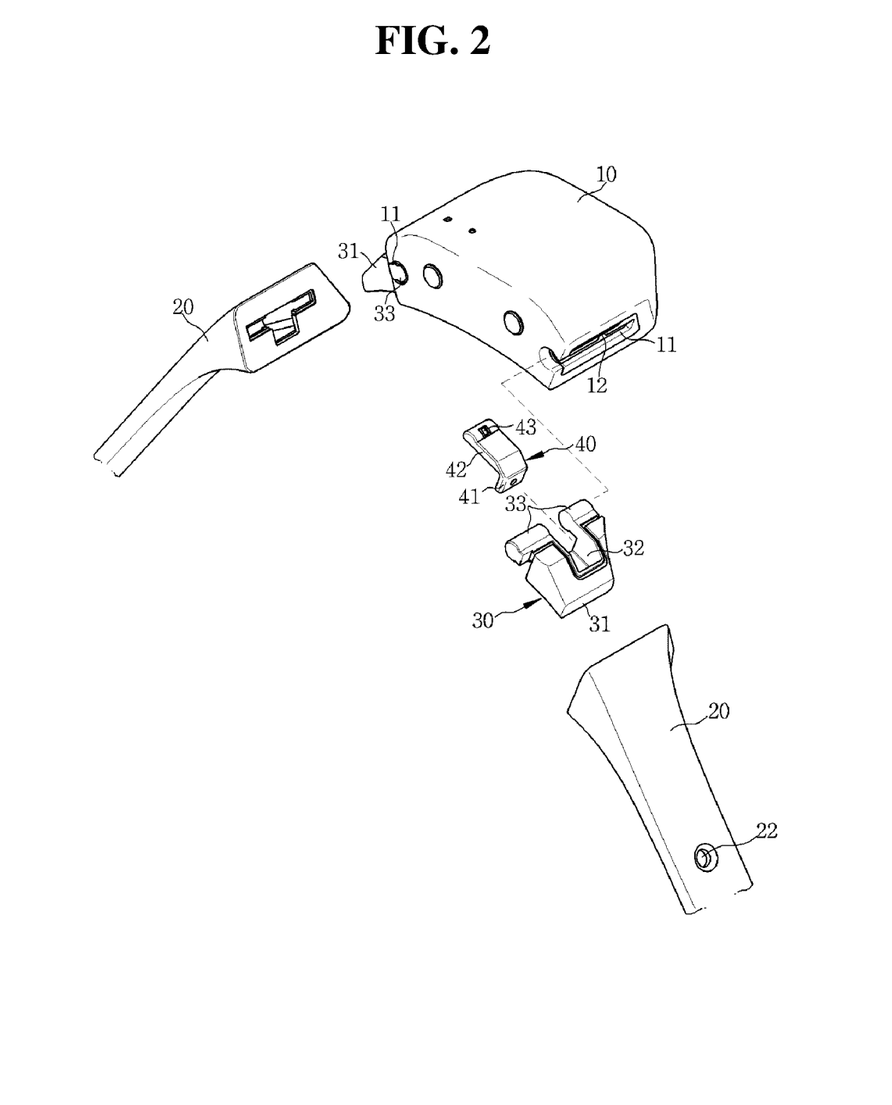
FIG. 2 is an exploded perspective view illustrating a configuration for detachment of the band-type wearing device for a pet shown in FIG. 1.
Figure 3:
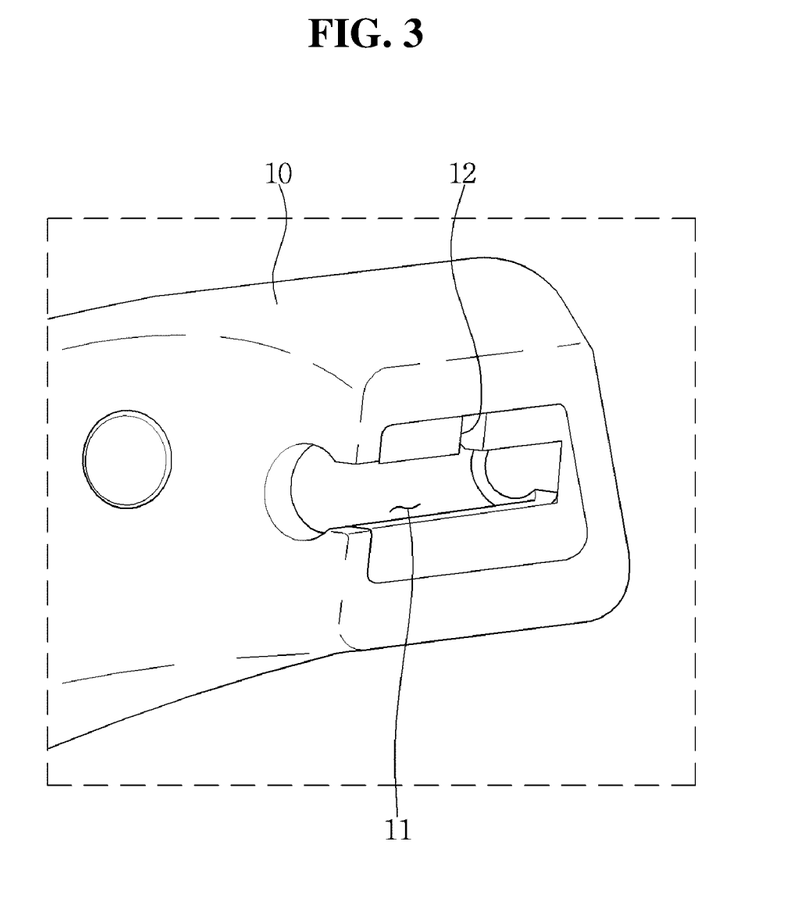
FIG. 3 is a view illustrating a part of a case of the band-type wearing device for a pet shown in FIG. 1.
Figure 4:
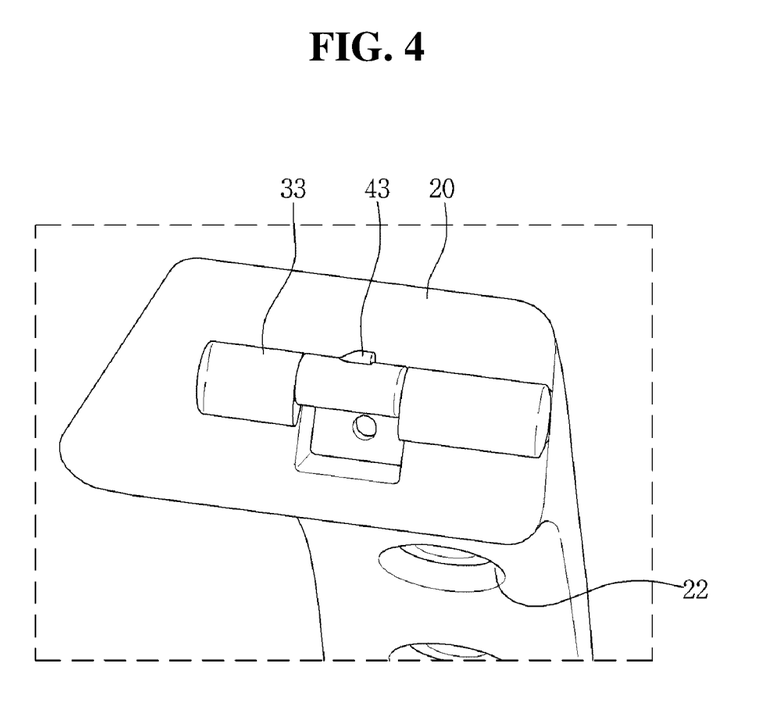
FIG. 4 is a view illustrating a part of a strap of the band-type wearing device for a pet shown in FIG. 1.
Figure 5:
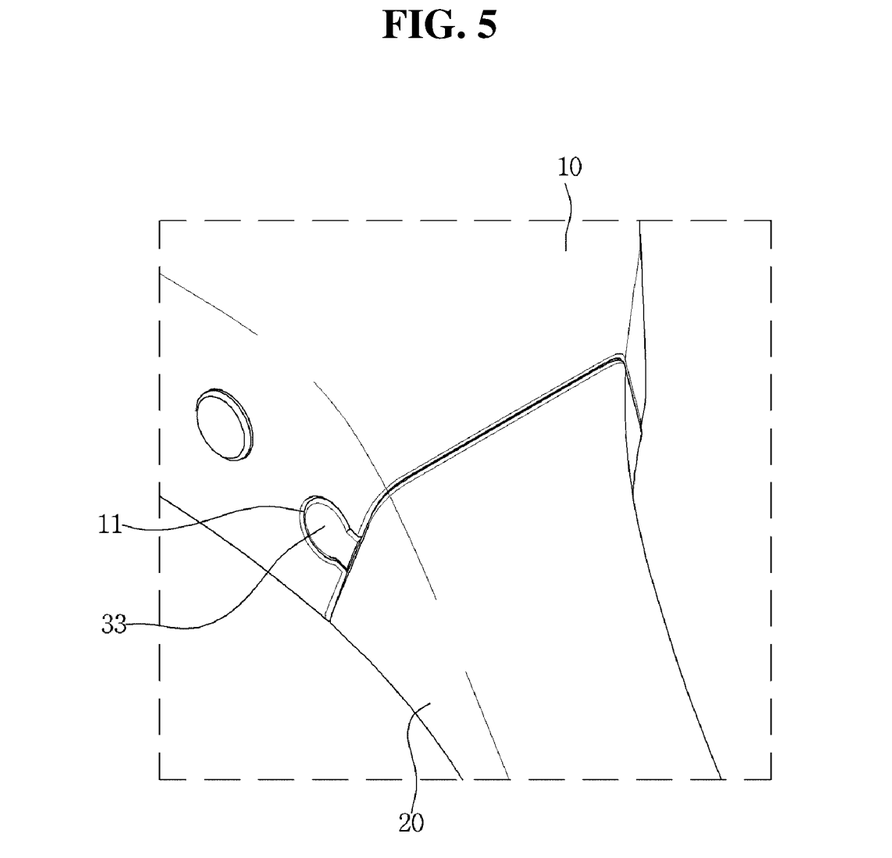
FIG. 5 is a perspective view illustrating an external state in which the case and the strap of the band-type wearing device for a pet shown in FIG. 1 are combined.
Figure 6:
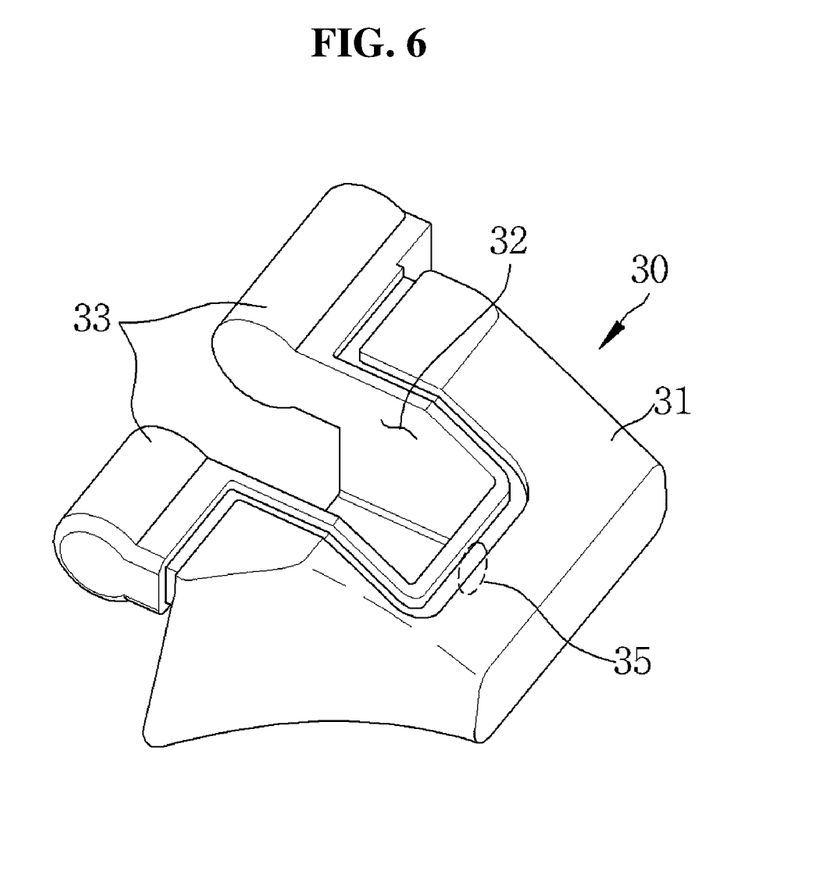
FIG. 6 is a perspective view illustrating a fixing bracket of the band-type wearing device for a pet shown in FIG. 1.
Figure 7:
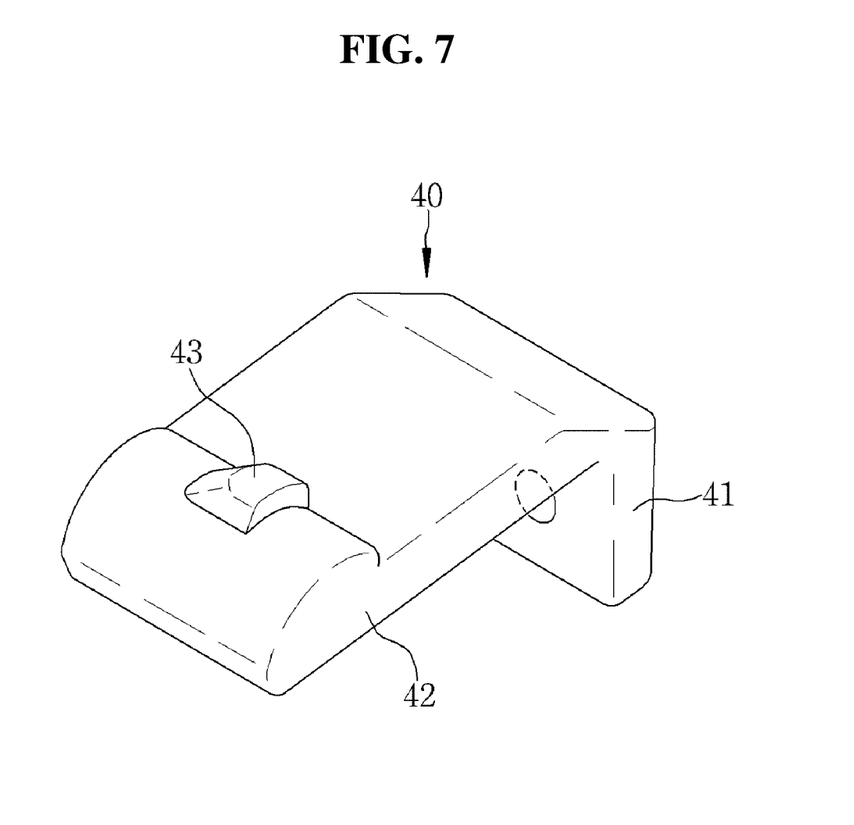
FIG. 7 is a perspective view illustrating a locking member of the band-type wearing device for a pet shown in FIG. 1.

In addition, as shown in FIG. 5, in a state in which the strap 20 is connected to the case 10, the sliding coupling portion 33 of the fixing bracket 30 is completely embedded in the coupling groove 11 of the case 10 and fastened thereto. Therefore, a fastened portion is not exposed to the outside. Therefore, it is possible not only to provide an excellent aesthetic appearance, but also to prevent a discomfort and risk of injury that could be caused by a portion protruding outward when the device is worn.

Meanwhile, in order to allow the user to press an accurate position where the locking member 40 is mounted during separation between the fixing bracket 30 and the case 10, a pressing position at the upper surface of the distal end of the strap 20 to coincide with the locking member 40 may be indicated and a pattern such as letters or arrows indicating directions for coupling and separation may be printed or engraved.

As described above, in the band-type wearing device for a pet of the present disclosure, the strap 20 having the fixing bracket 30 and the locking member 40 mounted therein may be manufactured by forming the fixing bracket 30 in the strap 20 by insert injection molding and then simply assembling the locking member 40 with the fixing bracket 30. In addition, since the case 10 only needs to be manufactured to have the coupling groove 11 formed therein, it is possible to reduce a manufacturing process and a manufacturing cost.

The present disclosure has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

The present disclosure relates to a wearable device for a pet, the device in which a case embedded with various electronic components to obtain state information of the pet such as a dog is easily, by one touch, fastened to and separated from a strap that is to be worn on a body part such as neck of the pet.

The invention claimed is:

1. A band-type wearable device for a pet, the device comprising:
 a case having a coupling groove formed so as to be opened to an outside, and a locking groove concavely formed in an upper side of the coupling groove;

a strap of which a distal end is connected to the case, and which is made of a flexible material wrapped around a body of the pet and worn on the pet;

a fixing bracket which is mounted at the distal end of the strap and comprises a sliding coupling portion formed to protrude outward from the distal end of the strap so as to be inserted by sliding into the coupling groove and connect the distal end of the strap to the case; and a locking member having an inner end, an outer end and a locking protrusion, the inner end being coupled to an inner side of the distal end of the strap such that displacement occurs downward by a force pressing an upper side of the distal end of the strap, the outer end protruding outward from the distal end of the strap together with the sliding coupling portion so as to be inserted while sliding into the coupling groove together with the sliding coupling portion, and the locking protrusion protruding from the locking member at an upper side of the outer end and being caught in the locking groove.

2. The device of claim 1, wherein the fixing bracket comprises:

a fixing portion embedded in the distal end of the strap and fixed thereto;

a mounting cutout portion having a form of a a groove concave downward in a middle of the fixing portion and having the locking member mounted therein.

3. The device of claim 2, wherein:

the locking member has an approximately ¬-shape, a vertical portion of the locking member is fixedly coupled to one end of the mounting cutout portion, the outer end of the locking member fits the sliding coupling portion and is inserted into the coupling groove together with the sliding coupling portion, and the displacement occurs as the horizontal portion is elastically bent downward by an external force transmitted through the upper side of the distal end of the strap.

4. The device of claim 1, wherein the fixing bracket is made of a hard material and is insert-injection molded into and fixed to the strap.

5. The device of claim 1, wherein:

the coupling groove is formed at both ends of the case, the strap is provided as two straps connected to respective coupling grooves at both ends of the case via the fixing bracket, and the respective straps are detachably connected to each other by a strap connecting member.

\* \* \* \* \*